April 29, 1930. L. C. HUFF 1,756,026
PROCESS OF REFINING OILS
Original Filed June 6, 1923  2 Sheets-Sheet 1
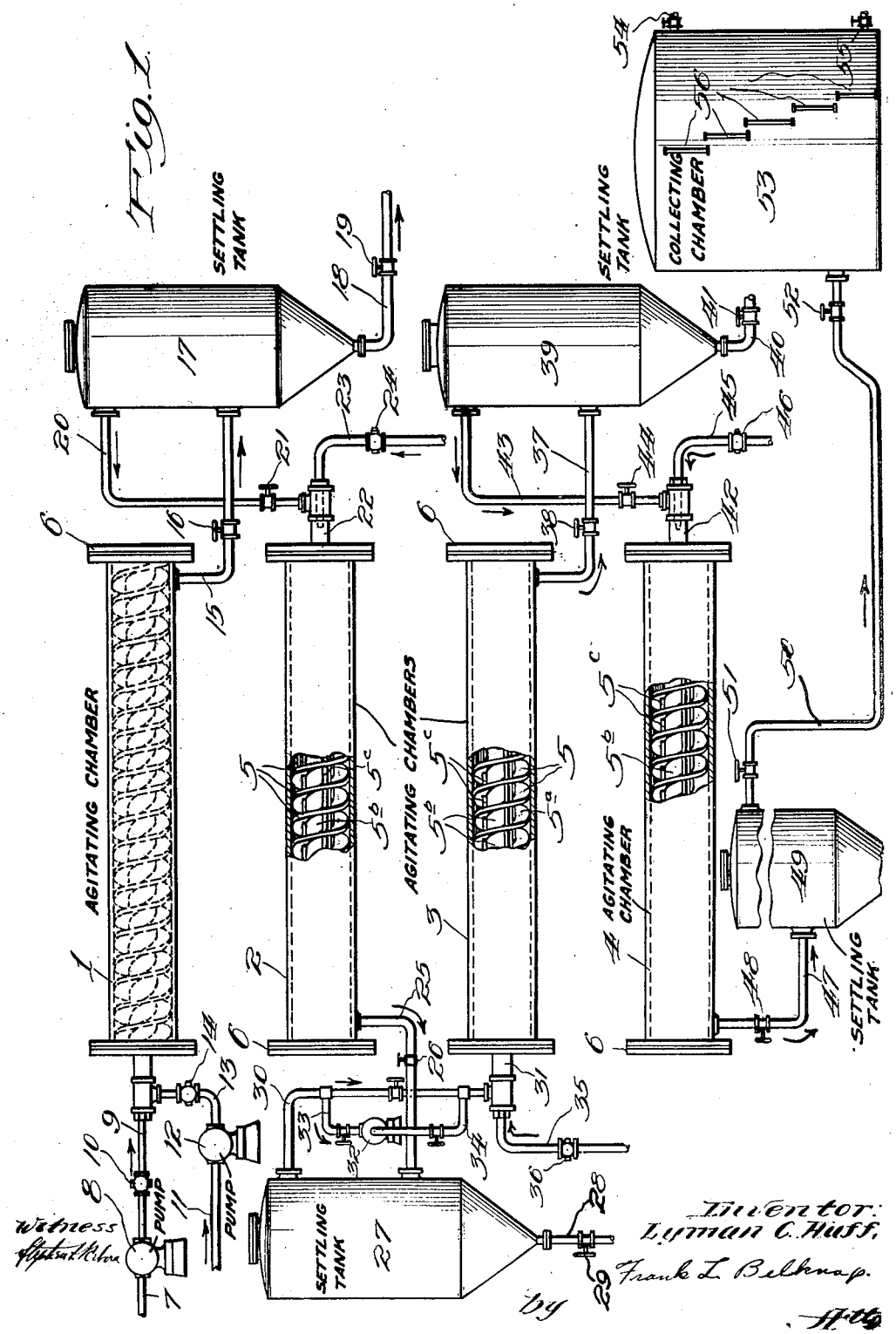

April 29, 1930.                L. C. HUFF                1,756,026
                         PROCESS OF REFINING OILS
                  Original Filed June 6, 1923    2 Sheets-Sheet 2
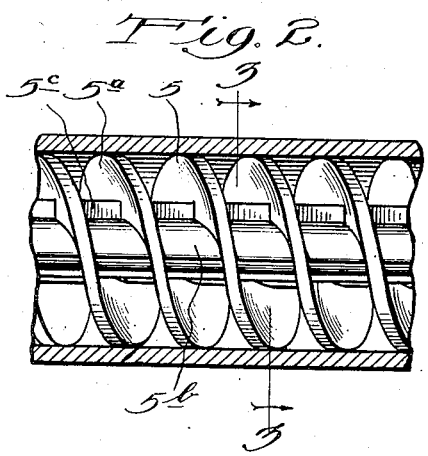
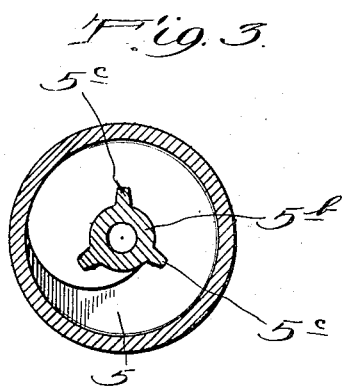
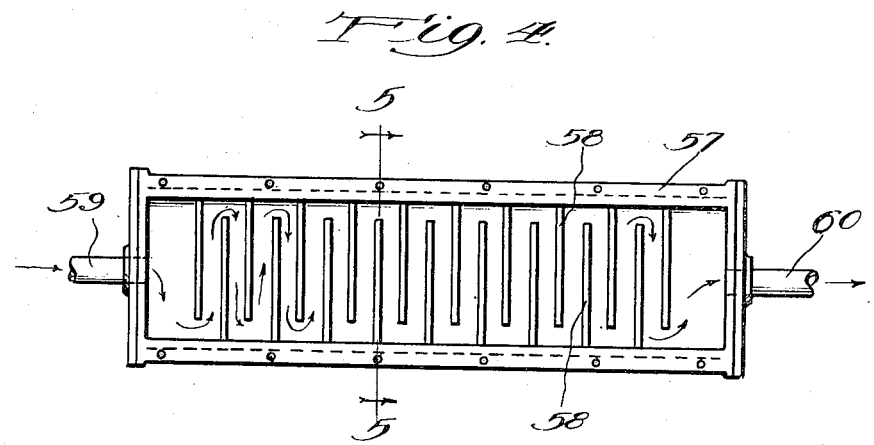
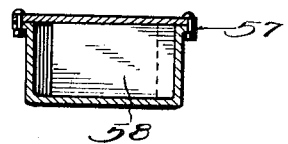

Patented Apr. 29, 1930

1,756,026

UNITED STATES PATENT OFFICE

LYMAN C. HUFF, OF CHICAGO, ILLINOIS, ASSIGNOR TO UNIVERSAL OIL PRODUCTS COMPANY, OF CHICAGO, ILLINOIS, A CORPORATION OF SOUTH DAKOTA

PROCESS OF REFINING OILS

Application filed June 6, 1923, Serial No. 643,777. Renewed February 20, 1928.

This invention relates to improvements in a process and apparatus for refining oils, and refers more particularly to a method of continuously treating such oils as pressure distillate to relieve the hydrocarbons of properties objectionable to their use as fuel.

Among the salient objects of the invention are to provide a process and apparatus whereby the oil is thoroughly mixed and agitated successively with treating materials whereby certain objectionable ingredients in the oil are separated therefrom in the form of a sludge or heavy substance which is settled out in stages interposed between the successive zones of refining treatment, and to provide an apparatus for efficiently carrying out this process.

Fig. 1 is a diagrammatic side elevational view of the apparatus with parts broken away in order to show the internal mechanism thereof.

Fig. 2 is a detail of the spiral baffle members.

Fig. 3 is a view taken along the line 3—3 in Fig. 2.

Fig. 4 is a modified form of construction.

Fig. 5 is a view taken along the line 5—5 in Fig. 4.

In brief, the method consists in charging distillate containing objectionable elements into the apparatus, and continuously circulating the liquid with a treating substance such as an acid through an initial stage wherein the materials are intimately intermixed and kept in turbulent agitation in their passage therethrough, assuring a complete treatment of the oil throughout.

The oil after passing through the initial stage is introduced to a relatively stagnant pool in which objectionable elements separated from the oil by the acid treatment are precipitated or gravitated to the bottom of the settling zone from which they are drawn off, the treated oil being directed to a second zone of treatment wherein it is similarly treated as in the initial zone with a water wash. Subsequent to this treatment, the oil is charged to the third stage and there treated with a basic material such as caustic soda or like material in order to counteract the acid still contained in the hydrocarbon and sweeten the product. It is then passed through a settling stage and thence to a final water wash from which the oil after a final settling is drawn off as a refined product.

Referring to the drawings at 1, 2, 3 and 4 are shown cylindrical casings which contain spiral baffle elements designated as 5, and shown more in detail in Figs. 2 and 3. These baffle members consist of a spiral screw in form having a continuous spiral blade designated as $5^a$ running around a central core $5^b$. At intervals on the periphery of the core and between the fins or blades are obstruction lugs $5^c$ which may be positioned at any desired intervals upon the periphery of the core. In the drawings these obstruction lugs are positioned 120° apart, as shown in Fig. 3.

These spiral baffles may be constructed of any desired material such as steel, porcelain or any type of ceramic material. If built of steel, the surfaces of the baffle member should be preferably tinned or leaded in order that the metal will not be acted upon chemically by the materials used in treating the oil. The baffle members are removable from the casings through the removable end plates 6.

The oil is introduced from any convenient source of supply through the pipe 7 and is charged by means of the pump 8 through the line 9 in which is interposed a valve 10. At the same time, an acid such as sulphuric acid commonly used as a hydrocarbon treating agent, is charged through the line 11 from any source not shown, and is forced by the pump 12 through the line 13 regulated by the valve 14 and combined with the oil introduced to the casing 1 in the line 9. This mixture of oil and acid is forced due to the pressure of the pumps and in a circuitous travel following the spiral fin of the baffle member throughout the length of the case. During its travel, it is kept in a turbulent condition and thoroughly intermingled with the acid with which it is mixed by the obstruction lugs $5^c$. The oil acid mixture is drawn off from the discharge end of the casing 1 through the line 15 regulated by a valve 16 and is introduced to the settling tank 17 where it collects in a considerable body, the separated impurities precipitating as a sludge in the bottom of the settling chamber from which they are drawn off through the line 18 manipulated by the valve 19. The treated oil rises to the top of the chamber, and is directed out through the pipe 20 in which is interposed a valve 21 to the inlet pipe 22 of the water washer 2.

Simultaneously with the introduction of the oil to the second treater, there is introduced thereto through the line 23 regulated by the valve 24, water under pressure and in controlled quantities. This water combines with the oil and is circulated with the oil through the second treater identical to the manner in which the oil was circulated through the initial stage. This water treatment serves to wash the oil of its acid content, the mixture being drawn off from the discharge end of the treater through the line 25 regulated by a valve 26 and introduced to a second settling chamber 27. Here again, the water containing acid sludge will gravitate to the bottom of the chamber, and may be drawn off through the line 28 controlled by the valve 29, the treated oil flowing through the upper pipe 30 into the charging line 31 of the third treater. A booster pump 32 with connections 33 and 34 to the line 30 and suitable controlling valves is interposed in this latter line to facilitate the circulation of the oil through the system, if desired.

To this third treater there is introduced with the oil through the line 35 controlled by the valve 36 a basic material such as caustic soda. After being treated with this material in the treater 3, the mixture is drawn off through the pipe 37 controlled by a valve 38, and is permitted to settle in the chamber 39. Here again the sludge containing the impurities and treating material is withdrawn from the bottom of the chamber through the drawoff line 40 regulated by the valve 41, while the treated oil flows to the charging line 42 of the final treater through the pipe 43 regulated by a valve 44.

In the final treater 4 the oil is subjected to a further water wash, the water being introduced through the line 45 controlled by the valve 46. From this final stage the oil and water mixture is drawn off through the pipe 47 regulated by a valve 48, and after passing through a final settling stage 49 is directed through the line 50 regulated by valves 51 and 52 to a storage tank 53, where it is collected as a refined product.

This storage tank is equipped with drawoff lines 54 and 55 controlled by suitable valves. Liquid level gauges 56 are positioned on the side of the tank for ascertaining the level therein.

No claim is made for any particular type of acid or basic treatment, the invention being directed particularly toward a process and apparatus in which the oil is continuously circulated through a system and subjected in the separate stages to a thorough treatment with materials best adapted to remove from the oil the objectionable ingredients.

A further advantage of the apparatus is its size and compact arrangement. A large amount of oil may be efficiently handled in relatively small treaters, the apparatus taking up much less space than the large agitating tanks now in use.

The treatment is more thorough due to the intimate mixture of the liquids caused by the high velocity and construction of the baffle elements. In the modified form of construction the spiral baffle or spiral core elements are replaced in a casing 57 by plates 58 positioned in such a manner that the oil is caused to pass through a circuitous route as it flows from the inlet pipe 59 of the casing to the discharge line 60.

The construction of this apparatus is diagrammatically shown in Figs. 4 and 5. While of a simpler construction, the modified form does not give the efficeint treatment nor as satisfactory results as the high velocity, and turbulent agitation caused by the spiral baffles.

I claim as my invention:

1. A process for refining oil, consisting in placing a stream of oil to be treated under a mechanically applied pressure, in simultaneously placing a stream of a treating agent under a mechanical pressure, in uniting said stream of oil with said stream of the treating agent and in causing the commingled materials, while under mechanical pressure, to flow at a high velocity in a spiral route through an elongated agitating vessel, wherein the oil and treating agent are rapidly caused to intimately commingle, in then introducing the commingled materials into an enlarged zone, wherein they assume a quiescent state, and wherein the oil and treating agent separate, and in separately removing the oil and treating agent from said enlarged zone.

2. A process for refining oil, consisting in placing a stream of oil to be treated under a mechanically applied pressure, in simultaneously placing a stream of treating agent under a mechanical pressure, in uniting said stream of oil with said stream of the treating agent and in causing the commingled materials, while under mechanical pressure, to flow at high velocity in a spiral route through an elongated agitating vessel, and in causing the commingled materials to be partially deflected at intervals along said spiral route, wherein the oil and treating agent are rapidly caused to intimately commingle, in then introducing the commingled materials into an enlarged zone, wherein they assume a quiescent state, wherein the oil and treating agent separate, and in separately removing the oil and treating agent from said enlarged zone.

LYMAN C. HUFF.